US008204906B2

(12) United States Patent
Dettinger et al.

(10) Patent No.: US 8,204,906 B2
(45) Date of Patent: Jun. 19, 2012

(54) ABSTRACTION BASED AUDIT AND SECURITY LOG MODEL FOR INCREASED ROLE AND SECURITY ENFORCEMENT

(75) Inventors: Richard Dean Dettinger, Rochester, MN (US); Daniel Paul Kolz, Rochester, MN (US); Frederick Allyn Kulack, Rochester, MN (US); Erik Edward Voldal, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 11/777,327

(22) Filed: Jul. 13, 2007

(65) Prior Publication Data

US 2009/0019092 A1 Jan. 15, 2009

(51) Int. Cl.
*G06F 7/00* (2006.01)
(52) U.S. Cl. .......................... 707/781; 707/783; 707/793
(58) Field of Classification Search .................. None
See application file for complete search history.

(56) References Cited

U.S. PATENT DOCUMENTS

| | | | |
|---|---|---|---|
| 5,253,362 A | 10/1993 | Nolan et al. | |
| 5,630,121 A | 5/1997 | Braden-Harder et al. | |
| 5,734,887 A | 3/1998 | Kingberg et al. | |
| 6,009,422 A | 12/1999 | Ciccarelli | |
| 6,233,586 B1 | 5/2001 | Chang et al. | |
| 6,363,391 B1 * | 3/2002 | Rosensteel, Jr. | 707/102 |
| 6,457,009 B1 | 9/2002 | Bollay | |
| 6,460,043 B1 | 10/2002 | Tabbara et al. | |
| 6,553,368 B2 | 4/2003 | Martin et al. | |
| 6,601,065 B1 | 7/2003 | Nelson et al. | |
| 6,725,227 B1 | 4/2004 | Li | |
| 6,803,927 B1 | 10/2004 | Sahoo | |
| 6,820,076 B2 | 11/2004 | Bailey et al. | |
| 6,928,431 B2 | 8/2005 | Detttinger et al. | |
| 6,954,748 B2 | 10/2005 | Dettinger et al. | |
| 6,996,558 B2 | 2/2006 | Dettinger et al. | |
| 7,096,229 B2 | 8/2006 | Dettinger et al. | |
| 2002/0078068 A1 | 6/2002 | Krishnaprasad et al. | |
| 2004/0181679 A1 * | 9/2004 | Dettinger et al. | 713/193 |
| 2005/0071337 A1 * | 3/2005 | Baranczyk et al. | 707/9 |
| 2006/0122965 A1 * | 6/2006 | Adams et al. | 707/2 |

OTHER PUBLICATIONS

Calmet, Jacques et al., A generic query-translation framework for a mediator architecture, Proceedings of the Thirteenth International Conference on Data Engineering, Apr. 1997, pp. 434-443, IEEE Computer Society, Washington, DC, United States.
Meng, Weiyi et al., A Theory of Translation From Relational Queries to Hierarchical Queries, IEEE Translations on Knowledge and Data Engineering, Apr. 1995, pp. 228-245, vol. 7, Issue 2, IEEE Computer Society, Washington, DC, United States.
The Llama, Search Code, 2000, <http://www.codewalkers.com/c/a/Search-Code/Search-Your-Database/>.

* cited by examiner

*Primary Examiner* — Tim T Vo
*Assistant Examiner* — Anh Tai Tran
(74) *Attorney, Agent, or Firm* — Patterson & Sheridan LLP

(57) ABSTRACT

Embodiments of the invention store log event records in a secure database log by encrypting information in a query, or in query results, that would otherwise be subject to unwanted disclosure (either from within or without a given organization). For example, an organization (e.g., a research institution) may allow a database administrator to review log event records to diagnose and correct system performance issues, without being forced to trust the administrator with sensitive medical data (e.g., medical records related to participants in a research study). Thus, the security of sensitive information may be maintained, while at the same time, the database administrator may still access the information needed to maintain a working system.

24 Claims, 6 Drawing Sheets

ABSTRACTION BASED AUDIT AND SECURITY LOG MODEL FOR INCREASED ROLE AND SECURITY ENFORCEMENT

CROSS-REFERENCE TO RELATED APPLICATIONS

This application is related to commonly assigned U.S. Pat. No. 6,996,558, issued Feb. 7, 2006, entitled "Application Portability and Extensibility through Database Schema and Query Abstraction," which is incorporated by reference herein in its entirety.

BACKGROUND OF THE INVENTION

1. Field of the Invention

Embodiments of the invention are related to computer databases. More specifically, embodiments of the invention are related to an abstraction based audit and security model that provides increased role and security enforcement for database log files.

2. Description of the Related Art

Auditing, tracking, and monitoring use of computer systems is crucial for computer systems used to capture, store, and manage sensitive data. Knowledgeable administrators frequently need to review audit logs and monitor user actions in order to keep a system running smoothly and allow end users to perform their day to day tasks.

Historically, administrators have been the 'trusted ones' and have frequently been given unfettered access to any information related to the function or operations of a computing environment. For example, a database administrator may have access to all of the data stored in a database managed by the administrator, as well as any information captured in log files. While security requirements are strictly enforced on the end users of a database system, the administrator often needs to be able to "peek behind the curtain" in order to monitor system operations and to resolve any issues that may arise. The need for complete trust in the system administrator, however, exposes an organization to undesirable risks. For example, in the medical field, inappropriate disclosure of an individual's medical records may permanently damage the reputation of an organization, as well as potentially expose the organization to civil and criminal liability. Similarly, inappropriate disclosure or misuse of financial records may lead to all kinds of mischief.

At the same time, however, auditing has to be done. A record of what has been done to a system (e.g., a database), what users have seen/accessed what data records, etc., needs to be available. That is, database logs are frequently required to ensure accountability for user actions as well as for managing system performance issues. From a database administrator's perspective, the data that should be tracked usually includes what users have executed what queries and what data points were returned in the results. Typically this information is stored in log files as textual output directly into a log or into other database records.

Storing this information in a log file creates an avenue for unwanted information compromise, both from the outside an organization (e.g., unauthorized access to the log file) as well as from within (e.g., misuse of information by users with authorized access to the log file). Put simply, an organization should not have to leave the security of sensitive data in database log files up to the trust placed in the administrator, and storing this information in a text-based log file may create unacceptable risks for sensitive data maintained by medical, research, financial, legal, and other types of organizations.

Accordingly, as the foregoing discussion demonstrates, there remains a need in the art for security mechanisms to protect sensitive data in system log files without unduly disrupting the ability of a system administrator from maintaining a running database system.

SUMMARY OF THE INVENTION

One embodiment of the invention includes a method for providing increased role and security enforcement for database log files. The method generally includes receiving, from a requesting entity, a request to view a log event record included in the database log files, where one or more elements of the log event record is stored in the database log files in an encrypted format. The method also includes decrypting the one or more elements of the log event record, retrieving, for each decrypted element of the log event record, a log visibility setting, and evaluating, for each decrypted element of the log event record, the visibility setting to determine whether to re-encrypt a given element prior to returning the log event record to the requesting entity. The method also includes, based on the evaluated log visibility settings, selectively re-encrypting any of the decrypted elements of the log event record determined to be re-encrypted and returning a resulting log event record to the requesting entity.

Another embodiment of the invention includes a computer-readable storage medium containing a program which, when executed, performs an operation for providing increased role and security enforcement for database log files. The operation generally includes receiving, from a requesting entity, a request to view a log event record included in the database log files, where one or more elements of the log event record is stored in the database log files in an encrypted format. The method also includes decrypting the one or more elements of the log event record, retrieving, for each decrypted element of the log event record, a log visibility setting, and evaluating, for each decrypted element of the log event record the visibility setting to determine whether to re-encrypt a given element prior to returning the log event record to the requesting entity. Based on the evaluated log visibility settings, the operation also includes selectively re-encrypting any of decrypted elements of the log event record determined to be re-encrypted. The resulting log event record is returned to the requesting entity.

Another embodiment of the invention includes a system having a processor and a memory containing a program, which when executed by the processor performs an operation for providing increased role and security enforcement for database log files. The operation generally includes receiving, from a requesting entity, a request to view a log event record included in the database log files, where one or more elements of the log event record is stored in the database log files in an encrypted format. The operation also includes decrypting the one or more elements of the log event record, retrieving, for each decrypted element of the log event record, a log visibility setting, and evaluating, for each decrypted element of the log event record the visibility setting to determine whether to re-encrypt a given element prior to returning the log event record to the requesting entity. The operation also includes, based on the evaluated log visibility settings, selectively re-encrypting any of decrypted elements of the log event record determined to be re-encrypted. The resulting log event record is returned to the requesting entity.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
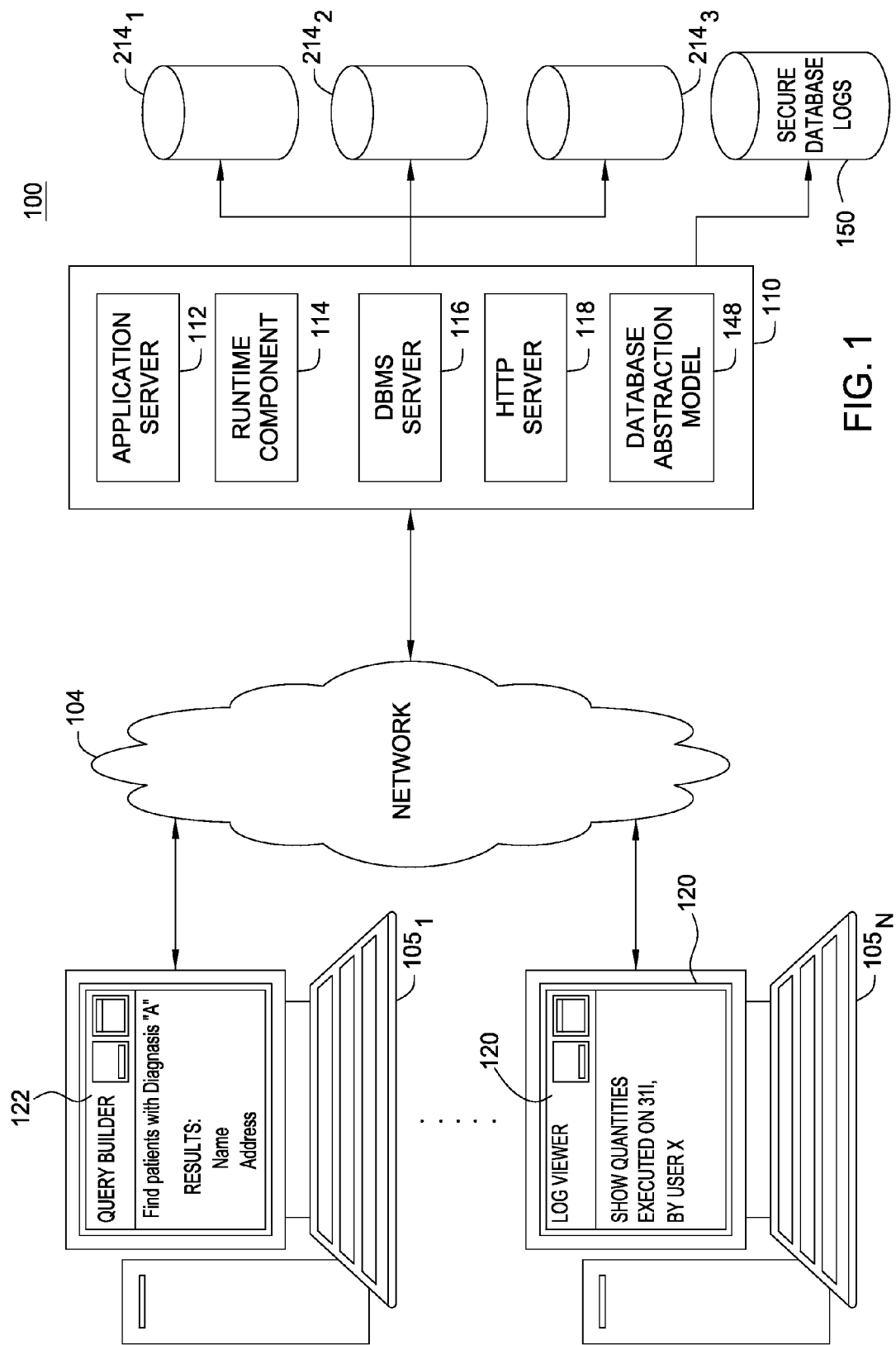
FIG. 1 is a block diagram illustrating a computing and data communications environment, according to one embodiment of the invention.

Embodiments of the present invention provide increased information security for log data generated for a database abstraction model. Generally, the data abstraction model provides an abstraction of an underlying physical database. The database abstraction model may provide users with an intuitive interface for composing a database query based on how a given user may understand the information reflected by data records in the underlying database. That is, users may compose database queries independently from the physical organization of the underlying database (e.g., independently from a relational database schema). Rather than compose queries based on the syntax and semantics of a given query language (e.g., SQL) and a physical data model, users compose queries from the logical fields of the database abstraction model.

Additionally, the database abstraction model may be tailored to provide a user with only the logical fields that are relevant for that particular user. The group of logical fields may reflect how that user conceptually understands the data being queried. For example, the database abstraction model may expose a medical researcher to different groups and categories of logical fields than other users of the same database (e.g., administrative or information technology staff). By limiting what fields a logical given user may include in an abstract query, the database abstraction model limits what data a given user has access to, and hence may provide an excellent security mechanism for sensitive data. Further, as the database abstraction model defines the security of the data in the first place (for purposes of data access) by exposing (or hiding) logical fields to different users, it may also be involved in determining what data in the log should look like to users, and what information from the log a given user should be able to access. In particular, the database abstraction model may be used to maintain the security of sensitive information, while at the same time, provide a database administrator with access to the information needed to maintain a working system.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM or DVD-ROM disks readable by a CD- or DVD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

The Database Abstraction Model: A Physical View of the Environment

FIG. 1 illustrates a networked computer system using a client-server configuration. Client computer systems $105_{1, N}$ include an interface that enables network communications with other systems over network 104. The network 104 may be a local area network where both the client system 105 and a server system 110 reside in the same general location, or may be network connections between geographically distributed systems, including network connections over the Internet. Client system 105 generally includes a central processing unit (CPU) connected by a bus to memory and storage (not shown). Further, client systems 105 are typically running an operating system configured to manage interaction between the computer hardware and the higher-level software applications running on the client system 105 (e.g., a Linux® distribution, a version of the Microsoft Windows® operating system IBM's AIX® or OS/400®, FreeBSD, and the like). ("Linux" is a registered trademark of Linus Torvalds in the United States and other countries.)

The server system 110 may include hardware components similar to those used by the client system 105. Accordingly, the server system 110 generally includes a CPU, a memory, and a storage device, coupled by a bus (not shown). The server system 110 is also running an operating system.

The environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, users interact with the server system 110 using a graphical user interface (GUI) provided by a client application 120, 122 running on client system 105$_{1, N}$. The GUI may include any combination of graphical elements such as windows, menus, buttons, ribbons, dialog boxes, etc. In a particular embodiment, GUI content may comprise HTML documents (i.e., web-pages) rendered on client system 105 using a web-browser. In such an embodiment, the server system 110 includes a Hypertext Transfer Protocol (HTTP) server 118 (e.g., a web server such as the open source Apache web-server or IBM's WebSphere® application) configured to respond to HTTP requests from the client system 105 and to transmit HTML documents to the client system 105. The web-pages themselves may be static documents stored on server system 110 or generated dynamically using application server 112 interacting with web-server 118 to service HTTP requests.

Alternatively, client application may comprise a database front-end or a query application program running on client system 105. Illustratively, client system 105$_1$ shows an interface representative of a query building tool 122. In one embodiment, query building tool 122 may be used to compose an abstract query and to submit the query to the runtime component 114 for processing. And client system 105$_N$ shows an interface representative of a log viewer tool 120. In one embodiment, log viewer tool allows an administrator (or other user) to access log records stored by secure database logs 150. As described in greater detail below, secure database logs 150 may encrypt all of the log records generated to record what queries and what data has been accessed by what users. When an administrator accesses log records, the database abstraction model may determine what information from a log event record in secure database logs 150 should be decrypted and presented to the administrator.

As illustrated in FIG. 1, server system 110 may further include runtime component 114, DBMS server 116, and database abstraction model 148. In one embodiment, these components may be provided using software applications executing on the server system 110. The DBMS server 116 includes a software application configured to manage databases 214$_{1-3}$. That is, the DBMS server 116 communicates with the underlying physical database system, and manages the physical database environment behind the database abstraction model 148. Users interact with the query interface to compose and submit an abstract query to the runtime component 114 for processing. Typically, users compose an abstract query from the logical fields defined by the database abstraction model 148. Logical fields and access methods are described in greater detail below in reference to FIGS. 2A-2B.

In one embodiment, runtime component 114 may be configured to receive an abstract query, and in response, to generate a "resolved" or "concrete" query that corresponds to the schema of underlying physical databases 214. For example, the runtime component may be configured to generate one or more Structured Query Language (SQL) queries from an abstract query. The resolved queries generated by runtime component are supplied to DBMS server 116 for execution. Additionally, runtime component 114 may be configured to modify the resolved query with additional restrictions or conditions, based on a focus specified of the abstract query. For example, if an abstract query specified a focus on "patients," then runtime component 114 may be configured to include conditions in the resolved query to limit data devalued or returned to information in the database related to patients.

Further, the content of each query submitted for execution, and the corresponding results, may be captured and stored in secure log database 150. Secure log database 150 may encrypt some, or all, of the content of each logged event (e.g., the content of each query and/or query results). One of skill in the art will recognize that a variety of specific encryption techniques may be used. For purposes of discussion, we assume an approach using a single symmetric key managed by the database abstraction model 148 and runtime component 114.

In one embodiment, when a request for log records from secure log database 150 is received, runtime component 114 may identify the relevant records from the secure log database 150 and decrypt those records. The attributes for each component may then be evaluated (e.g., the definition of each logical field included in a query), and if the administrator (or other user) is authorized to view the data retrieved from that field, or to view the fields included in a given abstract query (as reflected by a log record), then the unencrypted log records (or portions thereof) are returned to the administrator interacting with log viewer 120.

The Database Abstraction Model: Logical View of the Environment

Figure 2A:
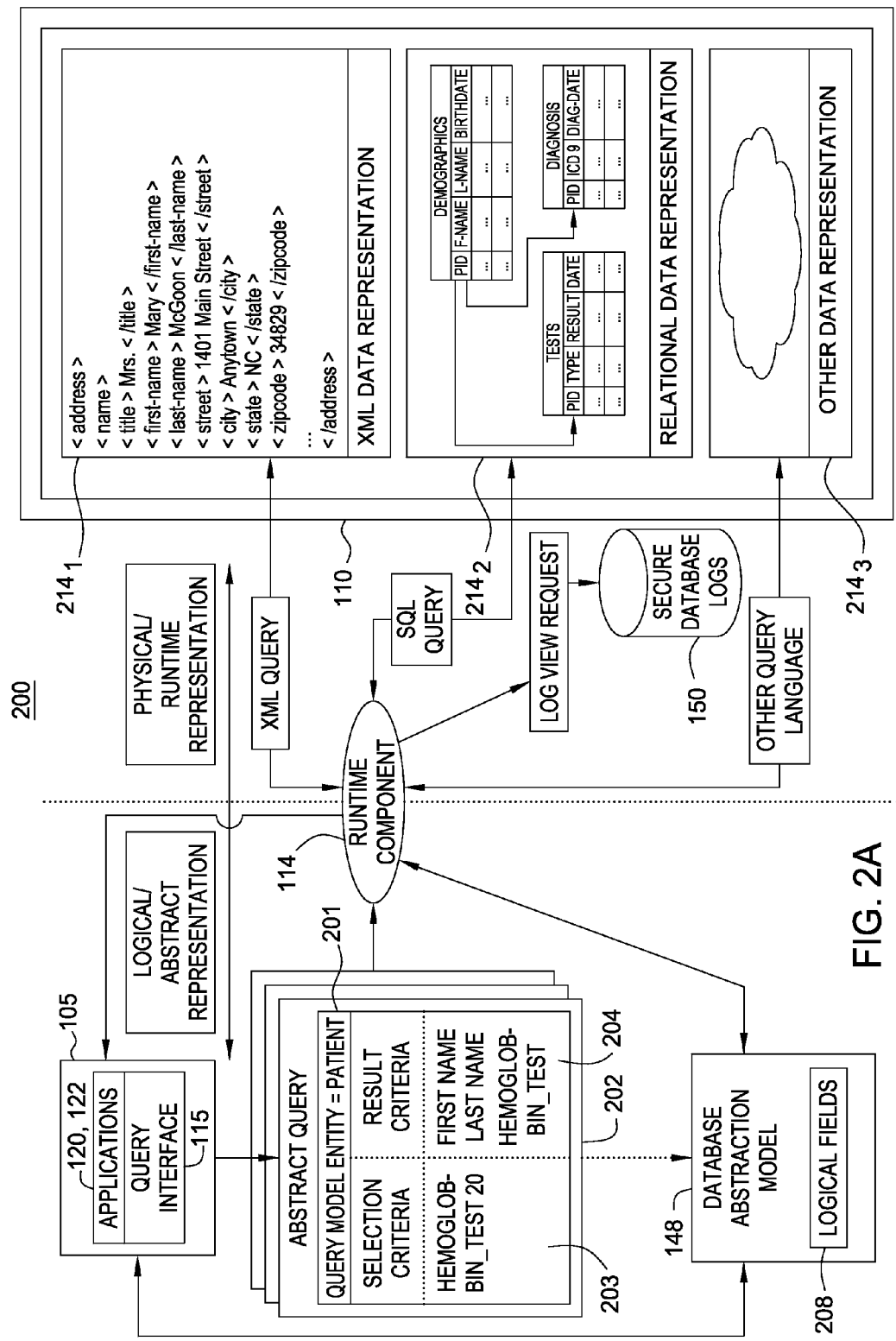
FIG. 2A illustrates a logical view of a database abstraction model constructed for an underlying physical database, according to one embodiment of the invention.

FIG. 2A illustrates a plurality of interrelated components of a database abstraction model, along with relationships between the logical view of data provided by the abstraction model environment (the left side of FIG. 2A), and the underlying physical database mechanisms used to store the data (the right side of FIG. 2A).

In one embodiment, the database abstraction model 148 provides a set of definitions for logical fields 208. Users may compose an abstract query 202 from logical fields 208 using a query building interface (e.g., query building tool 122). Abstract query 202 is generally referred to as "abstract" because it is composed from logical fields 208 rather than from direct references to data structures in the underlying physical databases 214 (e.g., table and column names). Abstract query 202 may also identify a model entity 201. The model entity 201 may be used to indicate the focus of the abstract query 202 (e.g., a query related to a "patient", a "person", an "employee", a "test", a "facility" etc).

Illustratively, abstract query 202 includes an indication of that the query is directed to instances of the "patient" model entity 201, and further includes selection criteria 203 indicating that patients with a "hemoglobin_test>20" should be retrieved. Selection criteria 203 are composed by specifying a condition evaluated against the data values that correspond to a logical field 208 (in this case the "hemoglobin_test" logical field. The operators in a condition typically include comparison operators such as =, >, <, >=, or, <=, and logical operators such as AND, OR, and NOT. Results criteria 204 indicates that data retrieved for this abstract query 202 includes data for the "name," "age," and "hemoglobin_test" logical fields 208.

The query building tool 122 may be configured to allow users to compose an abstract query 202 from the logical fields 208. The definition for each logical field 208 in the database abstraction model 148 may identify an access method. The access method may be used to map from the logical view of data exposed to a user interacting with the query building tool 122 to the physical view of data used by the runtime component 114 to retrieve data from the physical databases 214. In one embodiment, runtime component 114 retrieves data from the physical database 214 by generating a resolved query from the abstract query 202 based on the access methods specified in database abstraction model 148 for the logical fields included in the query. For example, an access method may include a query contribution to use in generating a resolved query, such as one or more SQL clauses that reference data objects in the underlying physical database 214.

An illustrative abstract query corresponding to abstract query 202 is shown in Table I below. In this example, the abstract query 202 is represented using extensible markup language (XML). In one embodiment, query builder 122 may be configured to generate an XML document to represent an abstract query. Those skilled in the art will recognize that XML is a well known markup language used to facilitate the sharing of structured text and information, other markup languages, however, may be used.

TABLE I

Query Example

```
001  <?xml version="1.0"?>
002  <!--Query string representation: ("Hemoglobin_test > 20")
003  <QueryAbstraction>
004    <Selection>
005      <Condition>
006        <Condition field="Hemoglobin Test" operator="GT"
               value="20"
007      </Condition>
008    </Selection>
009    <Results>
010        <Field name="FirstName"/>
011        <Field name="LastName"/>
012        <Field name="hemoglobin_test"/>
013    </Results>
014    <Entity name="patient" >
015        <FieldRef name="data://patient/PID" />
016        <Usage type="query" />
017    </EntityField>
018    </Entity>
019  </QueryAbstraction>
```

The XML markup shown in Table I includes the selection criteria 203 (lines 004-008) and the results criteria 204 (lines 009-013). Selection criteria 203 includes a field name (for a logical field), a comparison operator (=, >, <, etc) and a value expression (what the field is being compared to). In one embodiment, the results criteria 204 include a set of logical fields for which data should be returned. The actual data returned is consistent with the selection criteria 203. Line 13 identifies the model entity selected by a user, in this example, a "patient" model entity. Thus, the query results returned for abstract query 202 are instances of the "patient" model entity. Line 15 indicates the identifier in the physical database 214 used to identify instances of the model entity. In this case, instances of the "patient" model entity are identified using values from the "Patient ID" column of a patient table.

In one embodiment, the secure log database 150 may store the abstract query in a log record in a form like the one shown in Table 1. Thus, the secure log database 150 may store a collection of XML documents representing abstract queries. Query results may also be represented as an XML document and stored in secure log database 150. Further, as stated, the log events (i.e., query metadata and query results) may be stored in secure log database 150 using an encrypted format. For example, the XML encryption standard published by the W3C may be used. XML encryption may be used to encrypt only specified portions of an XML document, leaving the rest of the document in its original form. XML documents consist of elements that are organized into a hierarchical tree structure. XML encryption may be used to encrypt selected elements. XML tags defined by the XML encryption standard may be used to bracket information to be encrypted.

Depending on the access method specified for a logical field 208, the runtime component 114 may generate a query of many different underlying storage mechanisms. For example, for a given logical field, runtime component 114 may generate an XML query that queries data from database $214_1$, an SQL query of relational database $214_2$, or other query composed according to another physical storage mechanism using "other" data representation $214_3$, or combinations thereof (whether currently known or later developed). Particular types of access methods and embodiments for executing abstract queries are further described in commonly assigned U.S. Pat. No. 6,996,558, entitled "Application Portability and Extensibility through Database Schema and Query Abstraction," which is incorporated herein in its entirety.

Figure 2B:
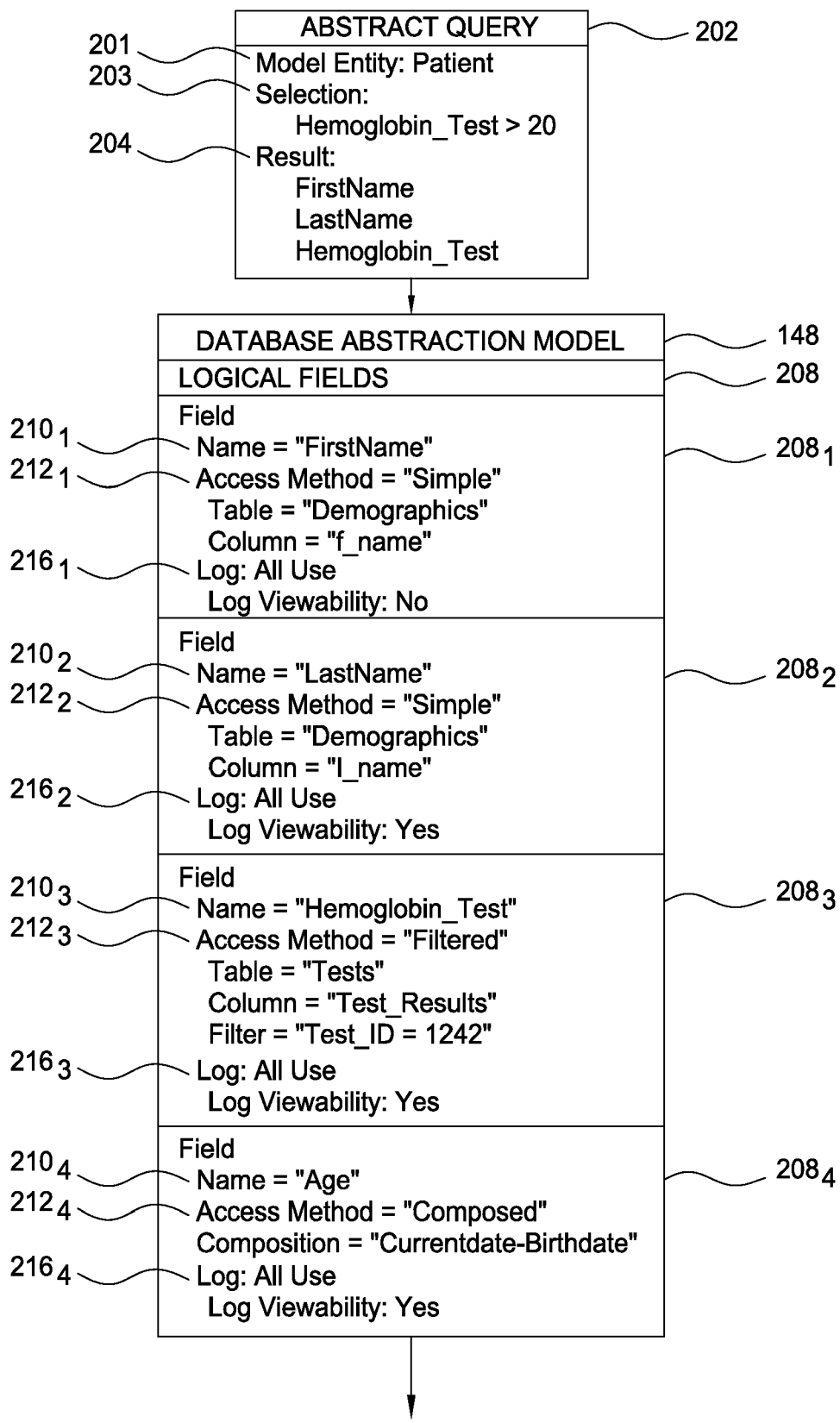
FIGS. 2B-2C illustrate an exemplary abstract query and database abstraction model, according to one embodiment of the invention.
Figure 2C:
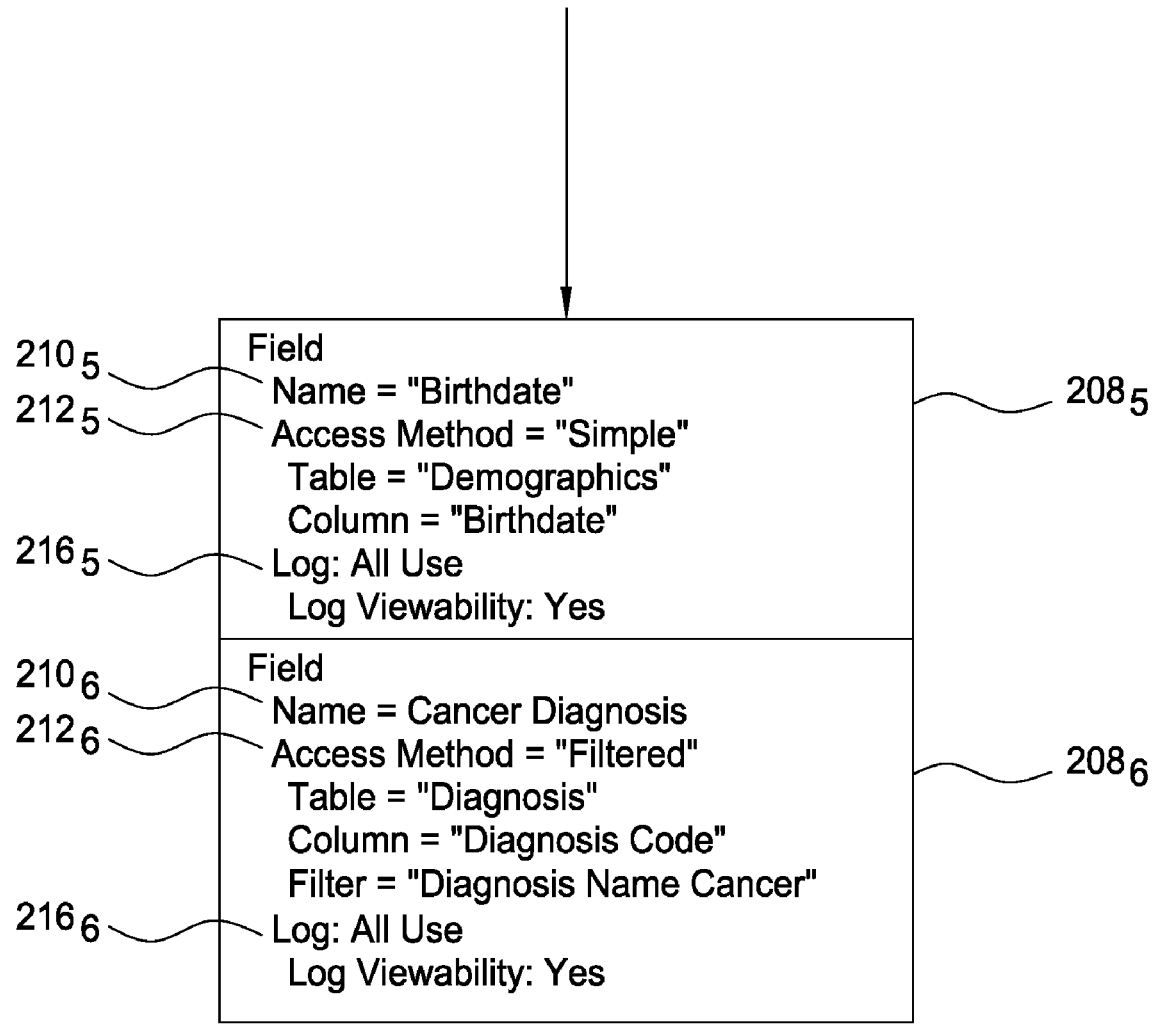

FIGS. 2B-2C illustrate an example of an abstract query 202, relative to the database abstraction model 148, according to one embodiment of the invention. In this example, the abstract query 202 includes selection criteria 203 indicating that the query should retrieve instances of the "patient" query entity 201 with a "hemoglobin" test value greater than "20." The particular information retrieved using abstract query 202 is specified by result fields 204. In this example, the abstract query 202 retrieves a patient's name and a test result value for a hemoglobin test.

FIGS. 2B-2C further illustrates an embodiment of a database abstraction model 148 that includes a plurality of logical field definitions $208_{1-6}$ (six shown by way of example). The access methods included in a given logical field definition 208 (or logical field, for short) provide a mapping for a given logical field 208 to tables and columns in an underlying relational database (e.g., database $214_2$ shown in FIG. 2A). As illustrated, each field specification 208 identifies a logical field name $210_{1-6}$ and an associated access method $212_{1-5}$. Depending upon the different types of logical fields, any number of access methods may be supported by the database abstraction model 148. FIGS. 2B-2C illustrate access method types for simple fields, filtered fields, and composed fields. Each of these three access method types are described below.

A simple access method specifies a direct mapping to a particular entity in the underlying physical database. Field specifications $208_1$, $208_2$, and $208_5$ each provide a simple access method, $212_1$, $212_2$, and $212_5$, respectively. For a relational database, the simple access method maps a logical field to a specific database table and column. For example, the simple field access method $212_1$ shown in FIGS. 2B-2C maps the logical field name $210_1$ "FirstName" to a column named "f_name" in a table named "Demographics."

Logical field specifications $208_3$ and $208_6$ provide examples of a filtered field access method, as indicated by access methods $212_3$ and $212_6$. Filtered access methods identify an associated physical database and provide rules defining a particular subset of items within the underlying database that should be returned for the filtered field. Consider, for example, a relational table storing test results for a plurality of different medical tests. Logical fields corresponding to each different test may be defined, and a filter for each different test is used to associate a specific test with a logical field. For example, logical field $208_3$ illustrates a hypothetical "hemoglobin test." The access method for this filtered field $212_3$ maps to the "Test Results" column of a "Tests" tests table and defines a filter "Test_ID='1243.'" Only data that satisfies the filter is returned for this logical field. Accordingly, the filtered field $208_3$ returns a subset of data from a larger set, without the user having to know the specifics of how the data is represented in the underlying physical database or having to specify the filtering criteria as part of the query building process.

Field specification $208_4$ exemplifies a composed access method $212_4$. Composed access methods generate a return value by retrieving data from the underlying physical database and performing operations on the data. In this way, information that does not directly exist in the underlying data representation may be computed and provided to a requesting entity. For example, logical field access method $212_4$ illustrates a composed access method that maps the logical field "age" $208_4$ to another logical field $208_5$ named "birthdate." In turn, the logical field "birthdate" $208_5$ maps to a column in a demographics table of relational database $214_2$. In this example, data for the "age" logical field $208_4$ is computed by retrieving data from the underlying database using the "birthdate" logical field $208_5$, and subtracting a current date value from the birth date value to calculate an age value returned for the logical field $208_4$. Another example includes a "name" logical field (not shown) composed from the first name and last name logical fields $208_1$ and $208_2$.

In addition to a logical field name 210 and an access method 212, a logical field definition may also include logging metadata 216. The logging metadata may specify, on a field-by-field basis, whether the use of a given logical field is captured in secure log database 150. In this example, logical fields 208 specify that "all use" of any of these example logical fields should be logged. Alternatively, logical field use could be logged on a per use type (e.g., only when a given field is used as part of selection criteria 203 or part of result criteria 204) or on a per-user basis (e.g., log queries on a per-user or per-group basis). Further, logging metadata 216 may specify how "visible" a logical field (or related database records) should be in the log file. That is, the logging metadata 216 may specify whether data related a given field (or even the use of a given field) should be visible to users viewing log records from secure log database 150 (e.g., using log viewer 120).

Like the decision to log(or not to log) the use of a given logical field, who may view log files related to a given logical field 208 may also be specified on a per-user, or per-group basis. As shown, log visibility for logical field $208_1$ specifies "yes," meant to indicate that the data abstraction model may return that data element or any references about that data element found in a log record in an unencrypted form. Thus, users may view instances of the "FirstName" field (or data records from this field) present in a log record. Conversely, log visibility for logical field $208_2$ specifies "no," meant to indicate that the data abstraction model may return this data element or any references about that data element found in a log record in an encrypted form. Thus, users may be prevented from viewing instances of the "LastName" field (or data records from this field) present in a log record. Additional examples of log visibility rules are provided below.

Additionally, the field specifications 208 shown in FIGS. 2B-2C are representative of logical fields mapped to data represented in the relational data representation $214_2$. However, other instances of the data repository abstraction component 148 or, other logical field specifications, may map to other physical data representations (e.g., databases $214_1$ or $214_3$ illustrated in FIG. 2A). Further, in one embodiment, the database abstraction model 148 is stored on computer system 110 using an XML document that describes the model entities, logical fields, access methods, and additional metadata that, collectively, define the database abstraction model 148 for a particular physical database system. Other storage mechanisms or markup languages, however, are also contemplated.

Figure 3:
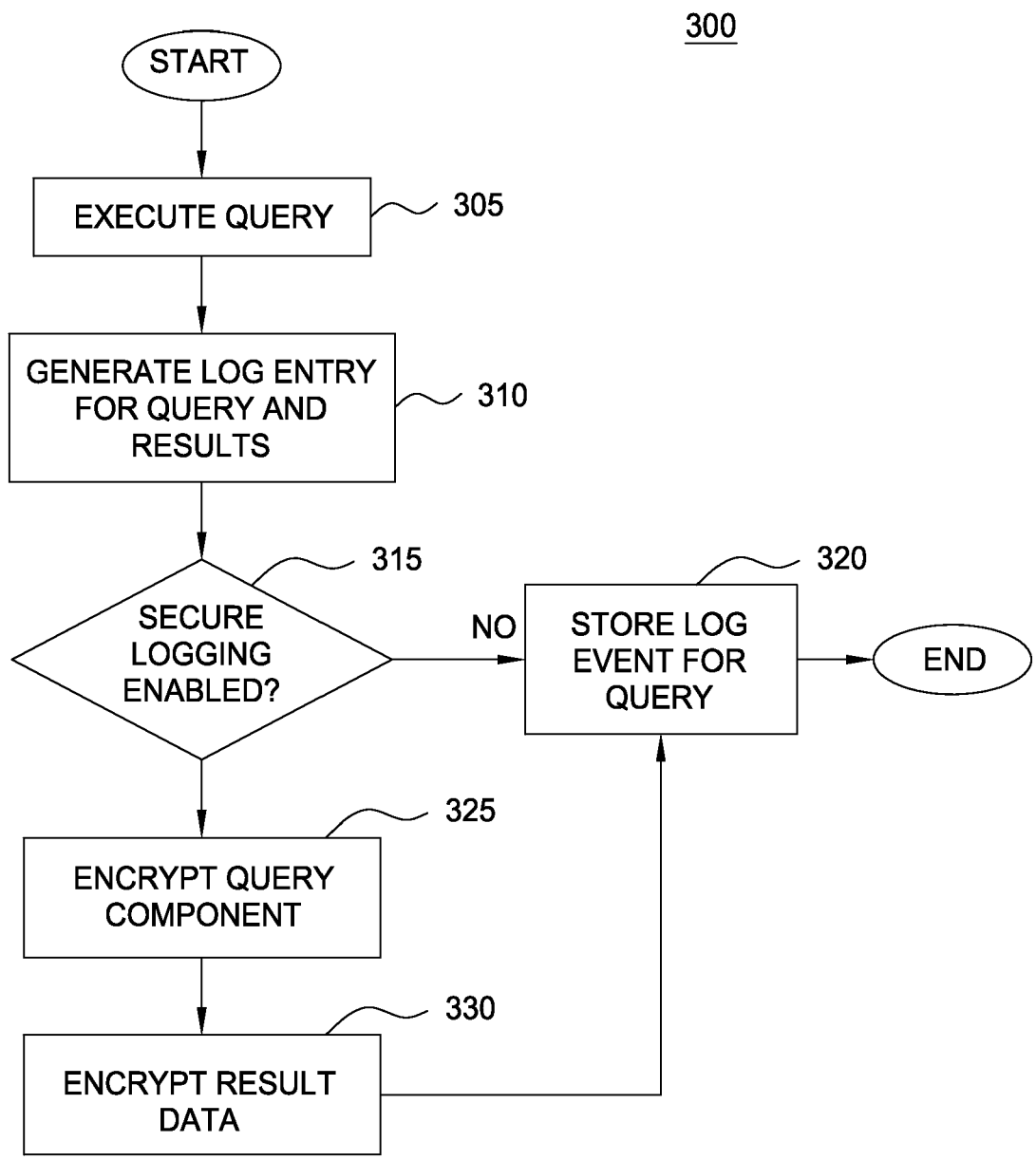
FIG. 3 illustrates a method for logging information related to users, queries, and data records accessed using a database abstraction model constructed for an underlying physical database, according to one embodiment of the invention.

FIG. 3 illustrates a method 300 for logging information related to users, queries, and data records accessed using a database abstraction model constructed for an underlying physical database, according to one embodiment of the invention. As shown, the method 300 begins at step 305 where a user composes and submits an abstract query for execution. At step 310, the runtime component 114 may generate a log event record. In one embodiment, the log event record may capture the actual query, attributes of the user running the query, and any data records returned in response to executing the query.

At step 315, the runtime component 114 may determine whether secure logging is enabled or whether the logging metadata 216 of any logical field included the query indicates that the field (or records corresponding to that field) should be encrypted in the secure log database 150. If not, at step 320, then the log event record may be stored in the secure database logs 150 in an unencrypted, or generally accessible, form.

However, when the query executed at step 305 includes logical fields with logging metadata 216 indicating that the use of that field should be encrypted in a log event record, or if secure logging is turned on globally, then at step 325, the runtime component 114 may encrypt the query component of the query executed at step 305. And at step 330, the runtime component 114 may encrypt the query result data. At step 320, the log event may be stored in the secure database logs 150 in an encrypted, or generally inaccessible, form.

The operations of method 300 may be further illustrated using an example query. Consider the following example in which a researcher runs the query:

Select: "Patient ID", "Date of Last AIDS Diagnosis", and "Last White Blood Cell Count"
From: Data Abstraction Model
Where: "Patient ID" in <list of patient IDs>

Running this query may result in a set of data records like the following:

|  | "Patient ID" | "Date of Last AIDS Diagnosis" | "Last White Blood Cell Count" |
| --- | --- | --- | --- |
| Record 1 | ID 1 | Date 1 | Count 1 |
| Record 2 | ID 2 | Date 2 | Count 2 |
| . . . | . . . | . . . | . . . |
| Record N | ID N | Date N | Count N |

In this example, the condition "in <list of patient IDs>" limits the query results to only a group of people being studied in a particular case. However, even without viewing any data records, the query itself may convey very sensitive information related to any individual in the list of patient IDs. Accordingly, the logical fields of "Patient ID", "Date of Last AIDS Diagnosis," and "Last White Blood Cell Count" may have security logging enabled.

An illustrative log event record corresponding to this query is shown in Table II, below. In this example, the log event record is generated using XML to store both the query itself, and the query results in an encrypted format.

TABLE II

Encrypted Log Event Record

| | |
|---|---|
| 000 | <QueryExecutedEvent name="Query1" owner="X" timestamp="..."> |
| 001 |   <query startTime="..." endTime="..."> |
| 002 |     (*&%#$(ˆ#(ˆ( )@kgj23i4g322398ty23kb*&%ˆ@*(#ˆ |
| 003 |   </query> |
| 004 |    |
| 005 |     <Row> |
| 006 |       <Value data="@#LIK@$" /> |
| 007 |       <Value data="@#3223" /> |
| 008 |       <Value data="234dfwK@$" /> |
| 009 |       <Value data="we#LI" /> |
| 011 |     </Row> |
| 012 |     <Row> |
| 013 |       [additional encrypted row data] |
| 014 |    |
| 015 | </QueryExecutedEvent> |

In this example, the query listed above is wrapped by a <query> tag (lines 001-003) where the actual content of the query is encrypted. The query results are wrapped by a tag (lines 004-014). Each record in the query result is captured by this log event record in an encrypted form, wrapped by the <row> and <value> tags. At the same time, much of the meta-information related to this query, e.g., the user who executed the query, how many records were returned, the time of day when the query was executed remains visible. Accordingly, the log event record may assist a system administrator in identifying and/or correcting performance issues or other problems as well as in managing a particular infrastructure, without disclosing sensitive information that may not be relevant to the administrator's task.

Figure 4:
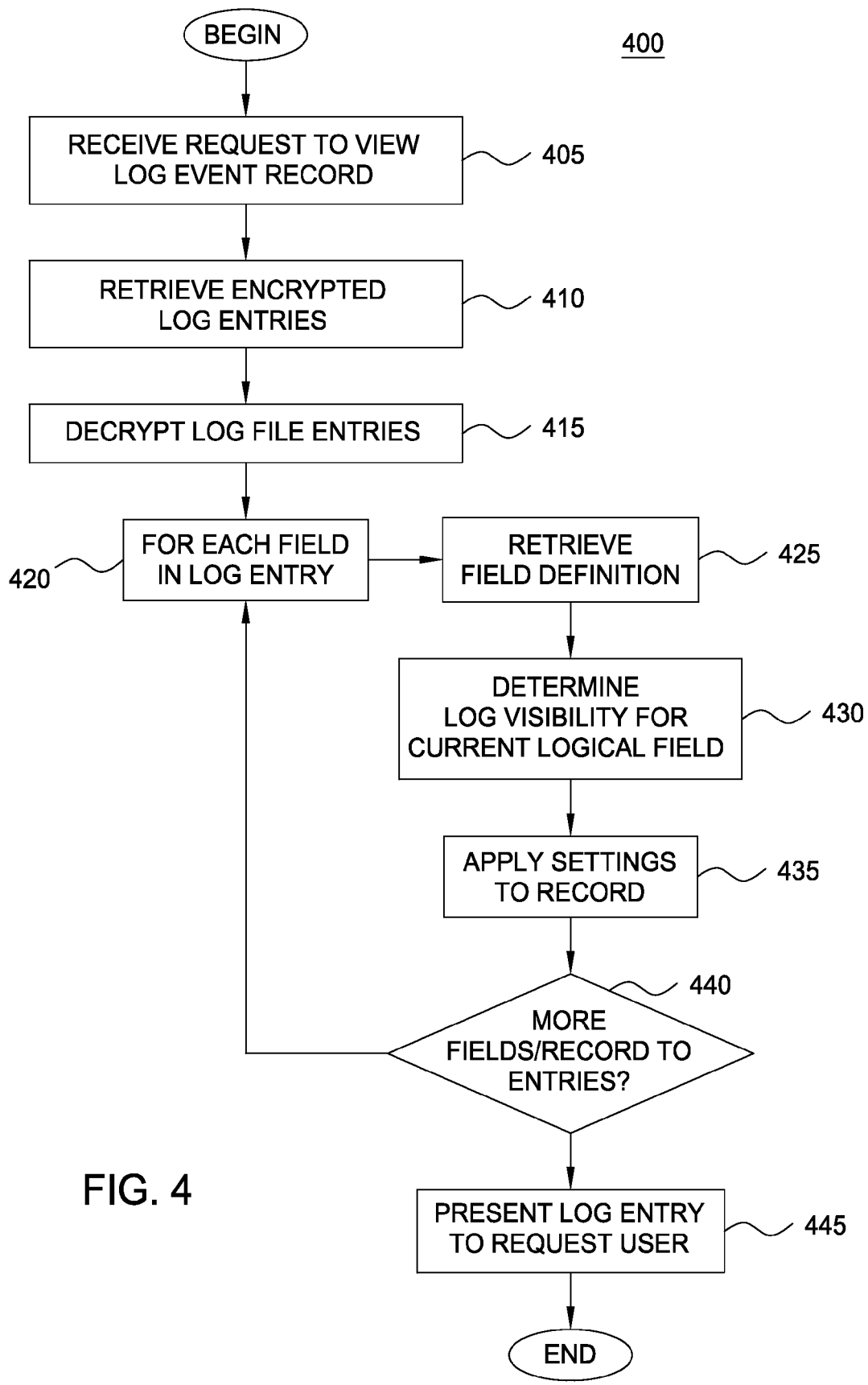
FIG. 4 illustrates a method for executing a request to view log records maintained for a database abstraction model constructed for an underlying physical database, according to one embodiment of the invention.

In other cases, however, the system administrator (or other user) may be authorized to view some (or all) of the encrypted information stored in a log event record. FIG. 4 illustrates a method 400 for executing a request to view log records maintained for a database abstraction model constructed for an underlying physical database, according to one embodiment of the invention.

As shown, the method 400 begins at step 405, where the runtime component 114 receives a request to view a log event record stored in secure database logs 150. In response, at step 410, the runtime component 114 may retrieve the encrypted log entries from the secure database logs 150. And at step 415, the runtime component 114 may decrypt the encrypted data stored in the log event records retrieved at step 410.

For example, Table III illustrates the log event record shown in Table II, above, in a decrypted form:

TABLE III

Decrypted Log Event Record

| | |
|---|---|
| 000 | <QueryExecutedEvent name="Query1" owner="X" timestamp="..."> |
| 001 |   <query startTime="..." endTime="..."> |
| 002 |     <selection criteria> |
| 003 |       <Patient ID> |
| 004 |       <Date of Last AIDS Diagnosis> |
| 005 |       <Last White Blood Cell Count> |
| 006 |     </selection criteria> |
| 007 |      |
| 008 |       <Condition field="Patient ID" operator="IN" /> |
| 009 |         <list> |
| 010 |           <Value data="4002" /> |
| 011 |           <Value data="4003" /> |
| 012 |           ... |
| 013 |           <Value data="4004" /> |
| 014 |         </list> |
| 015 |       </Condition> |
| 016 |      |
| 017 |   </query> |
| 018 |    |
| 019 |     <Row> |
| 020 |       <Value data="4002" /> |
| 021 |       <Value data="1/1/2003" /> |
| 022 |       <Value data="1200" /> |
| 023 |     </Row> |
| 024 |     <Row> |
| 025 |       [additional row data] |
| 027 |     </Row> |
| 026 |    |
| 027 | </QueryExecutedEvent> |

As shown, the original database query is wrapped by a <query> tag (lines 001-017). The query results are wrapped by a  tag (lines 018-026). Each record in the query result is captured by this log event record in a decrypted form, wrapped by the <row> and <value> tags. In one embodiment, some, or all, of the decrypted query elements may be re-encrypted before the log event record is presented in response to the user request received at step 405.

At step 420, a loop begins where the runtime component 114 evaluates each element the decrypted log event. For example, runtime component 114 may identify each logical field included in the decrypted query and evaluate the logging metadata 216 defined for each such logical field. Thus, at step 425, the runtime component 114 may retrieve the logical field definition for a logical field included in the query event record (e.g., the "Patient ID", "Date of Last AIDS Diagnosis", and "Last White Blood Cell Count," logical fields). At step 430, the log visibility settings for the current logical field are determined. At step 435, the log visibility settings are applied to the portion the log event record that includes the current logical field. That is, if, based on the log visibility settings, and the credentials of the user requesting to view the log event record, the actual element of the log record may be re-encrypted. At step 440, the runtime component 114 determines whether additional elements of the log event record need to be evaluated. If so, the loop beginning with step 420 is repeated.

As stated, the visibility of data from a log event record may depend on the user requesting to view the log event record, on the definition of a given logical field, or some combination of these (or other) criteria. Examples of visibility settings include settings such as "Yes," "No," "No Result Data," "No Condition," "No Condition Data," among others. The effect of each of these settings may be defined as follows:

"Yes"—return the logical field and any references or corresponding data records in an unencrypted form.

"No"—re-encrypt the logical field and any references or corresponding data records "No Result Data"—re-encrypt only the query results, allowing an administrator (or other user) to analyze the query that was run for performance or other metrics, but not see the actual data that was returned.

"No Condition"—re-encrypt the entire condition criteria.

"No Condition Data"—re-encrypt only a conditional value specified in a query condition.

Of course, these, and other visibility settings may be tailored to suit the needs of a particular case.

Returning to the operations of method 400, once each element of the log event record is evaluated, and some, or all, elements re-encrypted, at step 445, the log event record may be returned to the user who submitted the request to view log events.

Advantageously, embodiments of the invention store log event records in a secure database log by encrypting information in a query, or in query results, that would otherwise be subject to unwanted disclosure (either from within or without a given organization). Further, the viewability of log event records in the secure database log may be tailored to provide the relevant individuals with the information they need to perform their assigned functions. For example, an organization (e.g. a research institution) may allow a database administrator to review log event records to diagnose and correct system performance issues, without being forced to trust the administrator with sensitive medical data (e.g., medical records related to participants in a research study). Thus, the security of sensitive information may be maintained, while at the same time, the database administrator may still access the information needed to maintain a working system.

While the foregoing is directed to embodiments of the present invention, other and further embodiments of the invention may be devised without departing from the basic scope thereof, and the scope thereof is determined by the claims that follow.

What is claimed is:

1. A computer implemented method for providing increased role and security enforcement for database log files, comprising:

receiving, from a requesting entity, a request to view a log event record included in the database log files, wherein one or more elements of the log event record is stored in the database log files in an encrypted format, wherein the log event record includes content of an abstract query and one or more data records retrieved from an underlying physical database and returned to a user in response to executing the abstract query, wherein each element of the log event record has a respective log visibility setting;

decrypting the one or more elements of the log event record, including decrypting at least one of the data records retrieved in response to executing the abstract query;

retrieving, for each decrypted element of the log event record, the log visibility setting;

evaluating, for each decrypted element of the log event record, the log visibility setting to determine whether to re-encrypt a given element prior to returning the log event record to the requesting entity;

based on the evaluated log visibility settings, selectively re-encrypting any of the decrypted elements of the log event record determined to be re-encrypted; and returning a resulting log event record to the requesting entity.

2. The method of claim 1, wherein the log event record further captures attributes of the user who submitted the abstract query for execution.

3. The method of claim 1, wherein the content of the abstract query includes a plurality of logical fields including a first group of logical fields specifying selection criteria for the abstract query and a second group of logical fields specifying results criteria for the abstract query.

4. The method of claim 1, wherein a new log event record is generated in response to receiving an abstract query for execution, and wherein the new log event record includes content of the received abstract query and any data records retrieved from an underlying physical database and returned to a user in response to executing the received abstract query.

5. The method of claim 1, wherein the log visibility setting comprises an indication to re-encrypt the corresponding decrypted element of the log event record comprising the at least one data record retrieved from the underlying physical database.

6. The method of claim 1, wherein the log visibility setting comprises an indication to re-encrypt the corresponding decrypted element of the log event record comprising results criteria for the abstract query.

7. The method of claim 1, wherein the log visibility setting comprises an indication to re-encrypt a portion of the corresponding decrypted element of the log event record comprising a conditional value of a result criteria for the abstract query.

8. The method of claim 3, wherein each of the plurality of logical fields includes at least access method specifying a method for accessing data in an underlying physical database and logging metadata specifying the log visibility setting for a corresponding logical field the log event record.

9. The method of claim 3, wherein the log visibility setting selectively exposes the logical fields to the requesting entity.

10. The method of claim 8, wherein the logging metadata for a given logical field specifies to re-encrypt any data records retrieved for the logical field, and to not re-encrypt the instance of that logical field in the abstract query.

11. The method of claim 9, wherein the given element comprises a definition of each logical field included in a logged query.

12. The method of claim 9, wherein the log visibility setting is chosen from the group consisting of: return the logical fields and any corresponding data records in an unencrypted form; re-encrypt the logical field and any corresponding data records; re-encrypt only query results; re-encrypt an entire condition criteria; and re-encrypt only a conditional value specified in a query condition.

13. A non-transitory computer-readable storage medium containing a program which, when executed, performs an operation for providing increased role and security enforcement for database log files, the operation comprising:

receiving, from a requesting entity, a request to view a log event record included in the database log files, wherein one or more elements of the log event record is stored in the database log files in an encrypted format, wherein the log event record includes content of an abstract query and one or more data records retrieved from an underlying physical database and returned to a user in response to executing the abstract query, wherein each element of the log event record has a respective log visibility setting;

decrypting the one or more elements of the log event record, including decrypting at least one of the data records retrieved in response to executing the abstract query;

retrieving, for each decrypted element of the log event record, the log visibility setting;

evaluating, for each decrypted element of the log event record the log visibility setting to determine whether to re-encrypt a given element prior to returning the log event record to the requesting entity;

based on the evaluated log visibility settings, selectively re-encrypting any of decrypted elements of the log event record determined to be re-encrypted; and returning a resulting log event record to the requesting entity.

14. The non-transitory computer-readable storage medium of claim 13, wherein the log event record further captures attributes of the user who submitted the abstract query for execution.

15. The non-transitory computer-readable storage medium of claim 13, wherein the content of the abstract query includes a plurality of logical fields including a first group of logical fields specifying selection criteria for the abstract query and a second group of logical fields specifying results criteria for the abstract query.

16. The non-transitory computer-readable storage medium of claim 13, wherein a new log event record is generated in response to receiving an abstract query for execution, and wherein the new log event record includes content of the received abstract query and any data records retrieved from an underlying physical database and returned to a user in response to executing the received abstract query.

17. The non-transitory computer-readable storage medium of claim 15, wherein each of the plurality of logical fields includes at least access method specifying a method for accessing data in an underlying physical database and logging metadata specifying the log visibility setting for a corresponding logical field the log event record.

18. The non-transitory computer-readable storage medium of claim 17, wherein the logging metadata for a given logical field specifies to re-encrypt any data records retrieved for the logical field, and to not re-encrypt the instance of that logical field in the abstract query.

19. A system, comprising:
a processor; and
a memory containing a program, which when executed by the processor performs an operation for providing increased role and security enforcement for database log files, the operation comprising:
receiving, from a requesting entity, a request to view a log event record included in the database log files, wherein one or more elements of the log event record is stored in the database log files in an encrypted format, wherein the log event record includes content of an abstract query and one or more data records retrieved from an underlying physical database and returned to a user in response to executing the abstract query, wherein each element of the log event record has a respective log visibility setting, decrypting the one or more elements of the log event record, including decrypting at least one of the data records retrieved in response to executing the abstract query, retrieving, for each decrypted element of the log event record, the log visibility setting, evaluating, for each decrypted element of the log event record the log visibility setting to determine whether to re-encrypt a given element prior to returning the log event record to the requesting entity, based on the evaluated log visibility settings, selectively re-encrypting any of decrypted elements of the log event record determined to be re-encrypted, and returning a resulting log event record to the requesting entity.

20. The system of claim 19, wherein the log event record further captures attributes of the user who submitted the abstract query for execution.

21. The system of claim 19, wherein the content of the abstract query includes a plurality of logical fields including a first group of logical fields specifying selection criteria for the abstract query and a second group of logical fields specifying results criteria for the abstract query.

22. The system of claim 19, wherein a new log event record is generated in response to receiving an abstract query for execution, and wherein the new log event record includes content of the received abstract query and any data records retrieved from an underlying physical database and returned to a user in response to executing the received abstract query.

23. The system of claim 21, wherein each of the plurality of logical fields includes at least access method specifying a method for accessing data in an underlying physical database and logging metadata specifying the log visibility setting for a corresponding logical field the log event record.

24. The system of claim 23, wherein the logging metadata for a given logical field specifies to re-encrypt any data records retrieved for the logical field, and to not re-encrypt the instance of that logical field in the abstract query.

* * * * *